United States Patent [19]
Dosier

[11] 3,880,047
[45] Apr. 29, 1975

[54] CHIP REMOVAL AND HOLD-DOWN DEVICE FOR LATERAL MOVEMENT ROUTERS

[75] Inventor: Paul A. Dosier, Newport Beach, Calif.

[73] Assignee: Paul Dosier Associates, Inc., Costa Mesa, Calif.

[22] Filed: Mar. 22, 1973

[21] Appl. No.: 343,842

[52] U.S. Cl................ 90/12 D; 51/170 T; 51/273; 83/100; 83/397; 83/451; 90/11 R; 144/252 R; 269/47; 408/58
[51] Int. Cl.............................................. B23c 1/20
[58] Field of Search....... 83/100, 925 CC, 451, 397; 144/251, 252; 51/273, 170 T; 90/11 R, 12 D; 29/DIG. 50, DIG. 58, DIG. 59, DIG. 84, DIG. 86; 408/56, 58, 79, 91, 99; 269/47

[56] References Cited
UNITED STATES PATENTS

| | | | |
|---|---|---|---|
| 2,101,458 | 12/1937 | Sachtleben............................ | 83/451 |
| 2,354,291 | 7/1944 | Grover................................ | 83/397 X |
| 2,420,905 | 5/1947 | Olsen.................................. | 408/56 |
| 2,944,465 | 7/1960 | Jones........................... | 144/252 R X |
| 2,957,375 | 10/1960 | Howlett............................... | 408/56 |
| 3,167,260 | 1/1965 | Gibbons et al............. | 144/242 R X |
| 3,673,744 | 7/1972 | Oimoen........................... | 51/273 X |
| 3,786,846 | 1/1974 | Mehring............................ | 83/100 X |

FOREIGN PATENTS OR APPLICATIONS
1,453,203   3/1969   Germany............................ 144/252

*Primary Examiner*—Andrew R. Juhasz
*Assistant Examiner*—W. D. Bray
*Attorney, Agent, or Firm*—Knobbe, Martens, Olson, Hubbard & Bear

[57] ABSTRACT

A hold-down and chip removal device for attachment to router machines. The device has a vacuum housing which attaches around the spindle housing of a router and surrounds the cutter locked in the spindle. The housing has an aperture in its lower surface through which the cutter extends. Attached around the periphery of this aperture is a hold-down and sealing brush. The vacuum housing is connected to a vacuum source so that, when the cutter is in the operational mode, the brush contacts the workpiece and establishes a vacuum chamber within the housing to promote chip removal. The brush also holds down the workpiece which is only laterally registered on the working surface of the machine.

21 Claims, 3 Drawing Figures

CHIP REMOVAL AND HOLD-DOWN DEVICE FOR LATERAL MOVEMENT ROUTERS

BACKGROUND OF THE INVENTION

This device relates to the field of spindle router machines which are used to cut specified designs in workpieces. More particularly, this invention deals with components attached to router machine to facilitate the removal of undesirable chips produced during the routing operation.

In the normal operation of a router machine, much waste material is produced in the form of dust particles and chips resulting from the cutting process. The presence of this waste is a source of several problems in the operation of the router machine. First, the production of dust and loose chips is dangerous for safety reasons, because not only is the dust detrimental if inhaled, but also possible flying chips could cause serious harm. Second, the presence of the waste material is detrimental to the life of the cutter, because the loose particles create friction and heat. Third, the existence of waste particles on the workpiece while the routing operation is performed requires, in many cases, a second routing of the workpiece, because the pressures incident to the routing cause some of the waste to be imbedded in previously cut areas.

Another characteristic of the normal operation of a router machine is that, when workpieces are placed on the working surfaces, it is necessary to clamp or fasten the workpiece to the working surface in order to avoid any misalignment of the workpiece during the routing operation. Consequently, after each workpiece or set of workpieces are completed, it is necessary to unfasten the workpieces for removal and then new workpieces are inserted and fastened. This is a very time consuming operation, especially in view of the fact that the new router machines are quite expensive and can perform the cutting at high speeds. Therefore, the unit cost of each workpiece is affected by the rate at which new workpieces can be placed on the machine. In the case of lightweight workpieces or parts, such as printed circuit boards, prior art devices require that the parts be fastened securely to the working surface before a vacuum is introduced to remove waste material, because the lightweight part would otherwise be lifted off the working surface during routing operation.

One area of concern in the operation of the router machine is that the cutting tool may break from fatigue or defects, resulting in a possibility of the broken part flying off the machine and presenting a danger to human safety. Prior art router machines do not provide an adequate protective shield for containing broken pieces of the cutting tool. Also prior art devices do not establish an adequate protective barrier to prevent an operator from entering into contact with the cutting tool while the machine is in operation.

A prior art approach for solving the problems of the waste material has been the use of air guns to blow the particles off the workpieces. However, this does not solve the inhalation problem nor does it perform adequately in removing all of the particles. Also, unless the air gun operation is concurrent with the routing work, there is another source of time delay in work production in having to blow the particles off the workpiece at various stages in the operation.

No prior art adequately solves, through the use of a single device, the above-related problems associated with chip removal and hold-down of workpieces in conjunction with the operation of a spindle type router. Some prior art devices are known which utilize an attachment for both the vacuum removal of chips and for applying pressure to parts. However, these devices are used in conjunction with a single position drill machine, where no lateral movement of the drill is contemplated. In the case of a router machine, lateral movement is essential and the use of such a prior art device would be impractical, for severe damage to the workpiece would result if such a device were moved laterally over the surface of a workpiece to be routed.

BRIEF SUMMARY OF THE INVENTION

The invention disclosed in the detailed description below comprises an attachment device to spindle type router machines. The device comprises a vacuum housing which connects to the spindle housing of a router machine and surrounds the cutter which is locked in the spindle. Situated around the bottom of the housing is a brush which extends down to a point adjacent the lower end of the cutter.

Since the vacuum housing is connected to a vacuum source, one advantage of the device is that it removes waste particles produced by the routing operation. When the cutter is in contact with the workpiece, the flexible brush maintains a sufficient seal for the vacuum regardless of the lateral motion of the cutter. This seal does not damage the workpiece. This vacuum removal is of great importance in providing a better environment for health and safety reasons as discussed previously. Also, this evacuation of the waste material enhances the life of the cutter and results in better quality of the finished product as well as saving time by eliminating second routing runs which were often necessary previously. Also the removal of the loose particles enables the cutter to operate at higher cutting rates with a cleaner, less friction-producing surface.

Another advantage of this device is the provision of means for holding down workpieces which are not locked on the working surface. As related above, it is quite important in terms of efficiency to be able to remove and replace workpieces as quickly as possible. By not having to lock and unlock workpieces on the working surface much lost time will be alleviated. With the use of tooling pins, the present device, with the brush contacting the workpiece, provides an adequate force to hold and orient the workpiece, eliminating the time consuming locking and unlocking steps. This quicker load change results in the machine being substantially more efficient.

Because this attachment device establishes a partial seal around the cutter during the routing operation, the combination of the housing and brush provide an excellent protective shield against flying chips or dust escaping which could be the source of harm to operators. Also the housing represents a protective shield to prevent an operator from coming into contact with the cutter while it is in operation.

In addition, proper sequencing of the vacuum applied to the device prohibits the vacuum from lifting lightweight workpieces such as printed circuit boards, out of registration with the router machine.

These and other advantages will become more readily apparent after a review of the drawings and the detailed description.

DETAILED DESCRIPTION OF INVENTION

Figure 1:
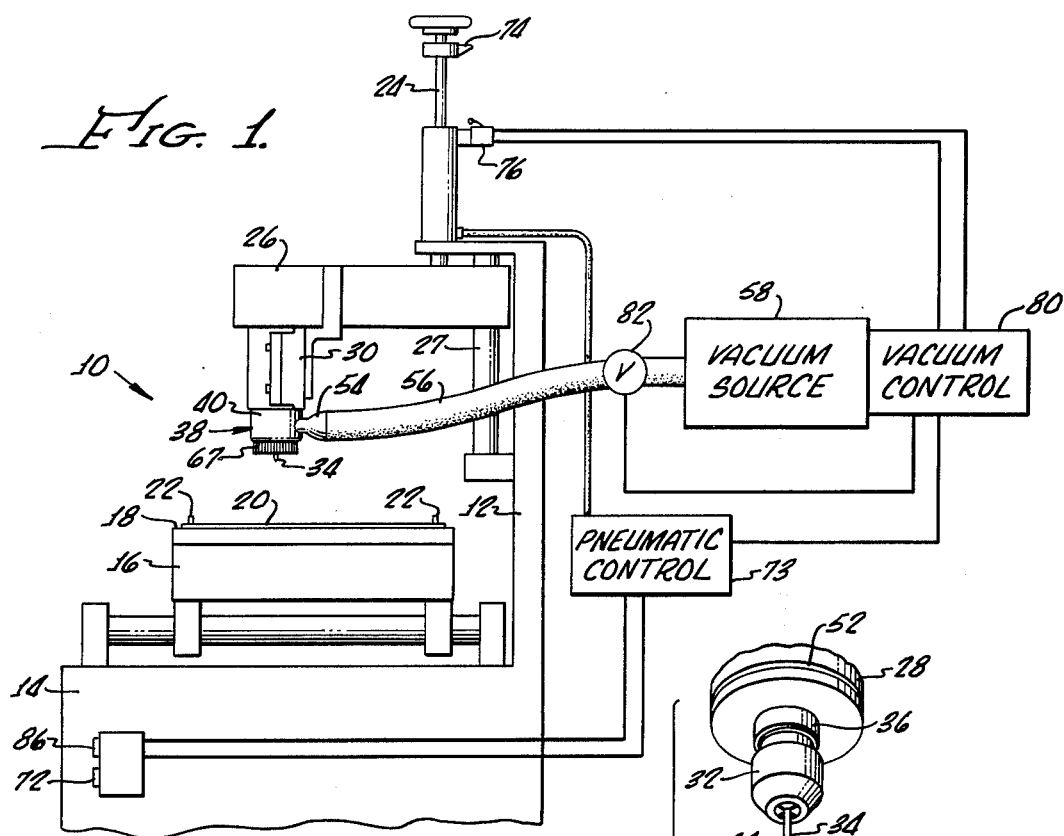
FIG. 1 is a side elevation view of a spindle type lateral movement routing machine with the chip removal and hold-down device attached to the spindle and connected to a vacuum source, having switch controls shown schematically.

FIG. 1 reflects a spindle type routing machine 10 with a main mounting bracket 12 and a base 14. Mounted on the upper portion of the base 14 is a subplate 16 whose upper surface is a working surface 18 which supports the workpiece 20. Attached to the subplate 16 and extending up from the working surface 18 are a set of tooling pins 22 which are used to hold the workpiece 20 in lateral alignment during the routing operation.

The subplate 16 and its associated pins 22 and workpiece 20 are movable relative to the base 14 in a lateral direction, that is, in a plane which is perpendicular to the axis of the spindle housing 28. Movement of the subplate 16 is controlled in a conventional manner, either manually by an operator or by numerical control apparatus, to guide the workpiece 20 laterally beneath the spindle housing 28.

Supported on the upper portion of the main mounting bracket 12 is a vertical control shaft 24 which reciprocates the spindle mounting platform 26 for vertical movement along a plurality of vertical guides or shafts 27. Connecting the spindle housing 28, shown in FIGS. 2 and 3, to the spindle mounting platform 26 is a spindle mounting bracket 30.

Figure 2:
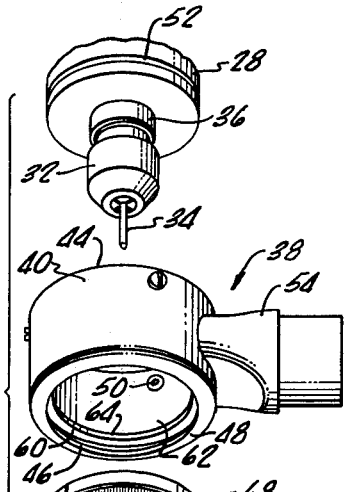
FIG. 2 is an exploded perspective view of the lower portion of the spindle and a cutter, with the vacuum housing and brush of the chip removal and hold-down attachment.
Figure 3:
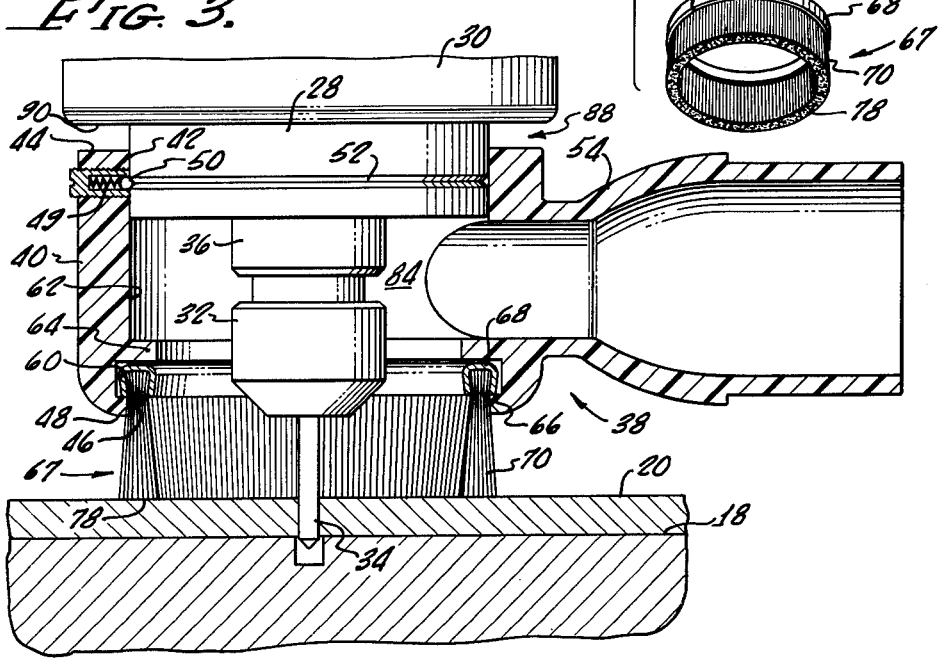
FIG. 3 is a cross-sectional view of the chip removal and hold-down device connected to the spindle housing.

With reference to FIGS. 2 and 3, the lower portion of the spindle housing 28 extends down beyond the spindle mounting bracket 30. Projecting down from the spindle housing 28 is the spindle collet nose 32 which receives and locks the cutting tool or cutter 34 to the spindle 36. The chip removal and hold-down device 38 includes a vacuum housing 40 which has an aperture 42 in its upper surface 44 and an aperture 46 in its lower surface 48. The upper aperture 42 is designed to be slightly larger than the size of the spindle housing 28, so that the housing 40 will fit snugly over the spindle housing 28. Located adjacent the upper surface 44 of the vacuum housing 40 and around the upper aperture 42 are a set of spring biased detent mechanisms such as balls 50 which fit into a detent or groove 52 circumscribing the lower cylindrical surface of the spindle housing 28. The spring 49 holds the ball 50 in the detent 52 to removably secure the vacuum housing to the spindle housing 28.

Extending from the side of the vacuum housing 40 is a tubular coupling 54 for connection to a vacuum conduit 56 and vacuum source 58 as shown in FIG. 1. Referring to FIG. 3, adjacent the lower aperture 46 of the housing 40 is an interior channel 60 circumscribing the interior surface 62 of the vacuum housing 40. The channel 60 has an upper lip 64 and a lower lip 66. Removably fitted in the channel 60 is a brush 67 having a connector ring or brush head 68. Extending down from the brush head 68 is a set of flexible bristles 70.

In the operation of the invention, the proper cutter 34 is locked into the spindle collet nose 32. The workpiece 20, which is to be machined, is positioned on the working surface 18. The workpiece has a set of holes to receive the tooling pins 22, so that the workpiece will maintain lateral orientation during the routing operation. The chip removal and hold-down device 38 is attached to the lower end of the spindle housing 28 by the biased contact of the balls 50 within the groove 52.

A starting switch 72 is activated which initiates a well known pneumatic control 73 to move the vertical control shaft 24 down to bring the cutter 34 into contact with the workpiece 20. As the vertical control shaft 24 is lowered, a throw arm 74, which is attached to the vertical control shaft 24, will initiate a vacuum switch 76 when the control shaft 24 is in such a position that the lower ends 78 of the bristles 70 contact the workpiece 20. The vacuum switch 76 operates a vacuum control 80 which will open a vacuum valve 82 in order to introduce a vacuum into the conduit 56 from the vacuum source 58.

The cutter 34 must first cut vertically into the workpiece 20 before the lateral routing can proceed; therefore, the cutter 34 initially extends below the ends 78 of the bristles 70 as shown in FIG. 1. Once the cutter 34 has reached the proper depth in the workpiece 20 for the routing, the bristles 70 will contact the workpiece, at which time a vacuum will be introduced within the vacuum housing 40 through the coupling 54 and the conduit 56. Thus the vacuum is not initiated until the bristles 70 contact the workpiece, assuring that the vacuum does not lift the workpiece out of registration with the pins 22. As the cutter 34 moves through the workpiece 20, much waste material in the form of dust and chips is produced. However, the brush bristles 70 establish a partial seal against the workpiece 20, forming a vacuum chamber 84 within the vacuum housing 40, so that waste particles are withdrawn from the workpiece 20 through the conduit 56. Also incident to the routing operation by the cutter 34 is the possibility of chips flying off the cutter 34 or workpiece 20. The interior surface 62 of the housing 40 and the bristles 70 contain such movement of the chips.

The contact of the brush 67 with the workpiece 20 results in a force exerted on the workpiece by the bristles 70. This force by the bristles 70 serves to hold down the workpiece 20 while the routing operation is being performed, because the workpiece 20 is not locked to the working surface 18, but rather is only registered on the tooling pins 22. As the cutter 34 moves laterally during the routing, the flexible bristles 70 easily follow this lateral movement while maintaining sufficient force on the workpiece 20. Also, the flexibility of the bristles 70 is important, since it allows the brush 67 to conform to the configuration of the workpiece 20 in order to maintain the partial seal for the vacuum housing 40 during the routing work.

In some instances multiple workpieces may be placed on the tooling pins 22 in a stacked relation and the flexible bristles 70 can conform to the added workpieces without any adjustment. The brush head 68 may be removed from the housing channel 60 and replaced with a different size brush for use in conjunction with various cutters and workpieces.

When the routing operation is completed, the lifting switch 86 is activated in order to operate the pneumatic control 73 to move the vertical control shaft 24 upward, separating the cutter 34 and brush 67 from the workpiece 20. However, to avoid the possiblity of the suction force within the vacuum housing 40 from lifting the workpiece 20 off the tooling pins 22, the lifting switch 86, through the pneumatic control 73, also initiates the vacuum control 80 to close the vacuum valve 82 prior to the brush 67 separating from the workpiece 20. This response of the vacuum control to the lifting switch 86 is significant, since mechanical inertia delays the subsidence of the vacuum in the vacuum housing 40 in response to the vacuum control 80. Thus, by closing the vacuum control valve 82 in response to the switch 86, rather than the switch 76, it can be assured that, by the time the bristles 70 release from the workpiece 20, the vacuum will be sufficiently reduced to avoid lifting of the workpiece 20.

As shown in FIG. 3, there is a gap 88 between the upper surface 44 of the vacuum housing 40 and the lower surface 90 of the spindle mounting bracket 30. In the event the force of the vacuum housing 40 is too great on the workpiece, the vacuum housing 40 will override or snap out of the ball groove 50/52 connection and reciprocate or move away from the workpiece in order to avoid damage to the workpiece.

What is claimed is:

1. A chip removal and hold-down attachment for use with a lateral movement router machine adapted for routing lightweight workpieces such as printed circuit boards, said machine having a spindle for mounting a cutting tool, said spindle rotatably mounted on a spindle housing, said spindle housing mounted for reciprocation on said router machine, said machine including a work surface for supporting said lightweight workpieces and registration means for locating said workpieces on said work surface, said attachment comprising:

a vacuum housing mounted on said router machine for reciprocation with said spindle housing and surrounding said cutting tool, said vacuum housing connected to a vacuum source for removal of chips produced by the router operation on a workpiece;

means located adjacent the lower surface of said vacuum housing for holding down said workpiece during said lateral movement router operation and for partially sealing said vacuum housing against said workpiece to provide a partial vacuum within said vacuum housing for the evacuation of said chips, said holding down means being the sole means for holding said workpiece down on said work surface during routing; and means for prohibiting said vacuum source from lifting said lightweight workpieces from said registration means prior to contact of said means for holding down with said workpiece.

2. A chip removal and hold-down attachment as defined in claim 1 wherein said means for holding down said workpiece and for partially sealing said vacuum housing against said workpiece comprises a set of bristles having one end secured to said vacuum housing and the other end extending toward said workpiece.

3. A chip removal and hold-down attachment as defined in claim 2 wherein said set of bristles has the other end attached to a brush head removably connected to said vacuum housing and extending around the periphery of said lower surface of said vacuum housing.

4. A chip removal and hold-down attachment as defined in claim 2 wherein said set of bristles are flexible, so that when said cutting tool is in contact with said workpiece and when said cutting tool moves laterally, said brush will maintain said partial seal between said housing and said workpiece.

5. A chip removal and hold-down attachment as defined in claim 1 wherein said means for holding down and for partially sealing is sufficiently flexible and non-abrasive to avoid surface damage to said workpiece when said cutting tool is in contact with said workpiece and when said cutting tool moves laterally.

6. A chip removal and hold-down attachment as defined in claim 1 wherein said means for holding down and for partially sealing is sufficiently flexible to allow the distance between said vacuum housing and said workpiece to vary during said routing operation without destroying said partial seal.

7. A protective shield attachment for use with lateral movement printed circuit board router machines having a spindle housing for mounting a rotating, cutting tool supporting spindle, said attachment comprising:

a vacuum source;

a vacuum housing connected to the lower end of said spindle housing of said router and surrounding said cutting tool in said spindle, said vacuum housing connected to said vacuum source and having an aperture in its lower surface through which said cutting tool extends for contact with the printed circuit board, said contact between said cutting tool and said printed circuit board producing chips which are contained by said vacuum housing;

means located around said aperture for holding down said printed circuit board during said lateral movement and for partially sealing said aperture against said workpiece to establish a vacuum chamber within said vacuum housing for removal of said chips; and means for prohibiting operation of said vacuum source exceptt when said holding down means is in contact with said printed circuit board to prohibit said vacuum source from lifting said printed circuit board.

8. A protective shield attachment as defined in claim 7 wherein said means for holding down said printed circuit board and for partially sealing said aperture against said printed circuit board comprises a set of bristles having one end attached to said vacuum housing and the other end in contact with said printed circuit board when said cutting tool is in operation.

9. A protective shield attachment as defined in claim 8 wherein said one end of said set of bristles are received in a circular rib removably connected to the periphery of said aperture.

10. A protective shield attachment as defined in claim 8 wherein said bristles are flexible, so that said attachment can accommodate variable numbers of printed circuit boards in stacked relation.

11. An attachment for a lateral movement router tool, having a spindle mounted within a spindle housing and a working surface with lightweight workpieces laterally registered but not affixed thereon, said attachment comprising:

a vacuum housing having an inner chamber, with an aperture in the upper and lower surfaces of said vacuum housing;

means located adjacent said aperture in said upper surface of said vacuum housing for connecting said vacuum housing to said spindle housing;

means attached to said vacuum housing for providing a peripheral partial seal for said inner chamber when said vacuum housing is connected to said spindle housing and said aperture in said lower surface of said vacuum housing is adjacent said workpiece, said means for providing said partial seal being a hold-down device for holding said workpiece to said working surface during said lateral movement of said router tool operation;

a vacuum source connected to said vacuum housing, so that, when said vacuum housing is adjacent said workpiece during said operation, loose particles produced by said operation are removed; and means for controlling operation of said vacuum source to prohibit said vacuum source from lifting said lightweight workpieces from said lateral registration when said means for providing a partial seal is not adjacent said lightweight workpiece.

12. An attachment for a router tool as defined in claim 11 wherein said means for providing a peripheral partial seal comprises a brush circumscribing the periphery of said aperture in said lower surface of said vacuum housing, said brush having a set of flexible bristles.

13. An attachment for a router tool as defined in claim 12 wherein said set of flexible bristles are attached to a removable connector ring for connection to said aperture of said vacuum housing.

14. An attachment for a router tool as defined in claim 11 wherein said means for connecting said vacuum housing to said spindle housing allows said vacuum housing to override said connection between said vacuum housing and said spindle housing to avoid damage to said workpiece if said vacuum housing introduces too great a force on said workpiece.

15. An attachment for a router tool as defined in claim 11 wherein said means for connecting said vacuum housing to said spindle housing comprises a detent mechanism adjacent said aperture in said upper surface of said vacuum housing, said spindle housing having means for cooperating with said detent mechanism for holding said vacuum housing.

16. An attachment for a router tool as defined in claim 15 wherein said means for cooperating with said detent mechanism comprises a groove in the outer surface of said spindle housing.

17. An attachment for a router tool as defined in claim 16 additionally comprising:

means for allowing override of said detent mechanism in response to excess force on said vacuum housing during router operation to allow said vacuum housing to reciprocate away from said workpiece to avoid damage to said workpiece.

18. A router machine comprising:

a mounting bracket;

a spindle attached to said mounting bracket;

a cutter connected to said spindle;

a working surface connected to said mounting bracket for lateral movement relative to said spindle and located below said cutter, said working surface maintaining a workpiece;

tooling pins extending up from said work surface to provide lateral registration for said workpiece;

a vacuum housing attached to the spindle housing and surrounding said cutter, said vacuum housing connected to a vacuum source;

means located around the lower periphery of said vacuum housing for holding down said workpiece during the routing operation; and means for prohibiting said vacuum source from lifting said workpiece from said tooling pins when said holding down means is displaced from said workpiece.

19. A router machine as defined in claim 18 wherein said means for holding down said workpiece additionally comprises means for sealing the interior of said vacuum housing against said workpiece, when said cutter is positioned for said routing operation, in order to establish a vacuum chamber within said vacuum housing.

20. A vacuum attachment for a router machine having a reciprocating spindle housing, mounting a rotating, tool carrying spindle, said attachment comprising:

a vacuum housing mounted on said router machine for reciprocation with said spindle housing of said router and surrounding the tool in said spindle, said vacuum housing connected to a vacuum source and having an aperture in its lower surface;

means located adjacent said aperture and mounted on said housing for holding down the workpiece and for partially sealing said vacuum housing against said workpiece during the routing operation to provide a vacuum chamber within said vacuum housing for chip removal, said means being the sole means for holding down said workpiece during routing; and means for automatically commencing and terminating the operation of the vacuum in response to reciprocation of said vacuum housing to prohibit said vacuum source from lifting said workpiece during reciprocation of said vacuum housing.

21. A vacuum attachment as defined in claim 20 wherein said means for holding down the workpiece and for partially sealing said housing against said workpiece comprises a brush attached around the periphery of said aperture, said brush having a set of flexible bristles extending down from said periphery.

* * * * *